Oct. 2, 1962
D. B. LEVINS
3,056,292
MASS FLOWMETER
Filed May 21, 1959
4 Sheets-Sheet 1
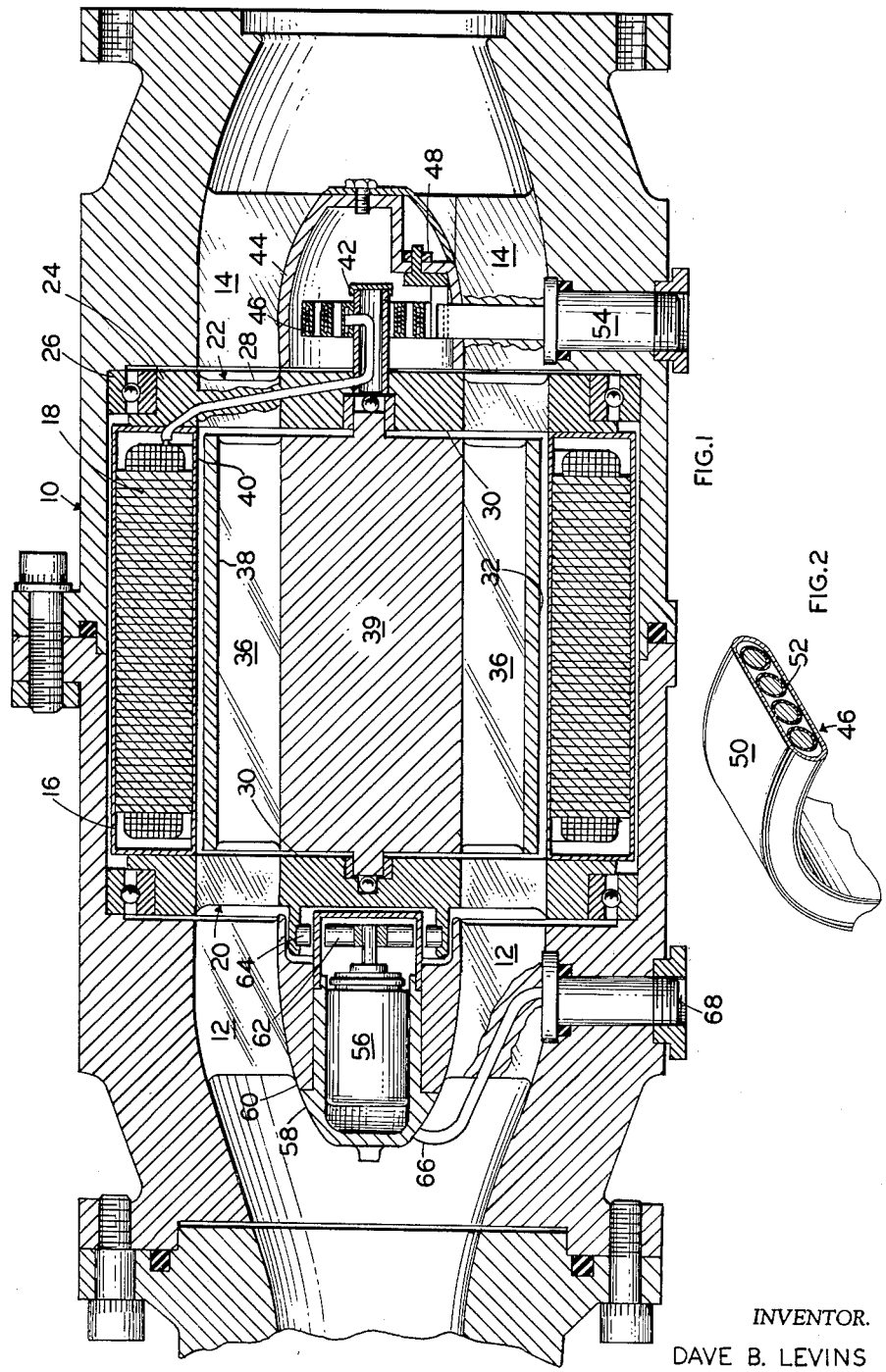
INVENTOR.
DAVE B. LEVINS
BY
Richard E. Harley
HIS ATTORNEY Oct. 2, 1962
D. B. LEVINS
3,056,292
MASS FLOWMETER
Filed May 21, 1959
4 Sheets-Sheet 2
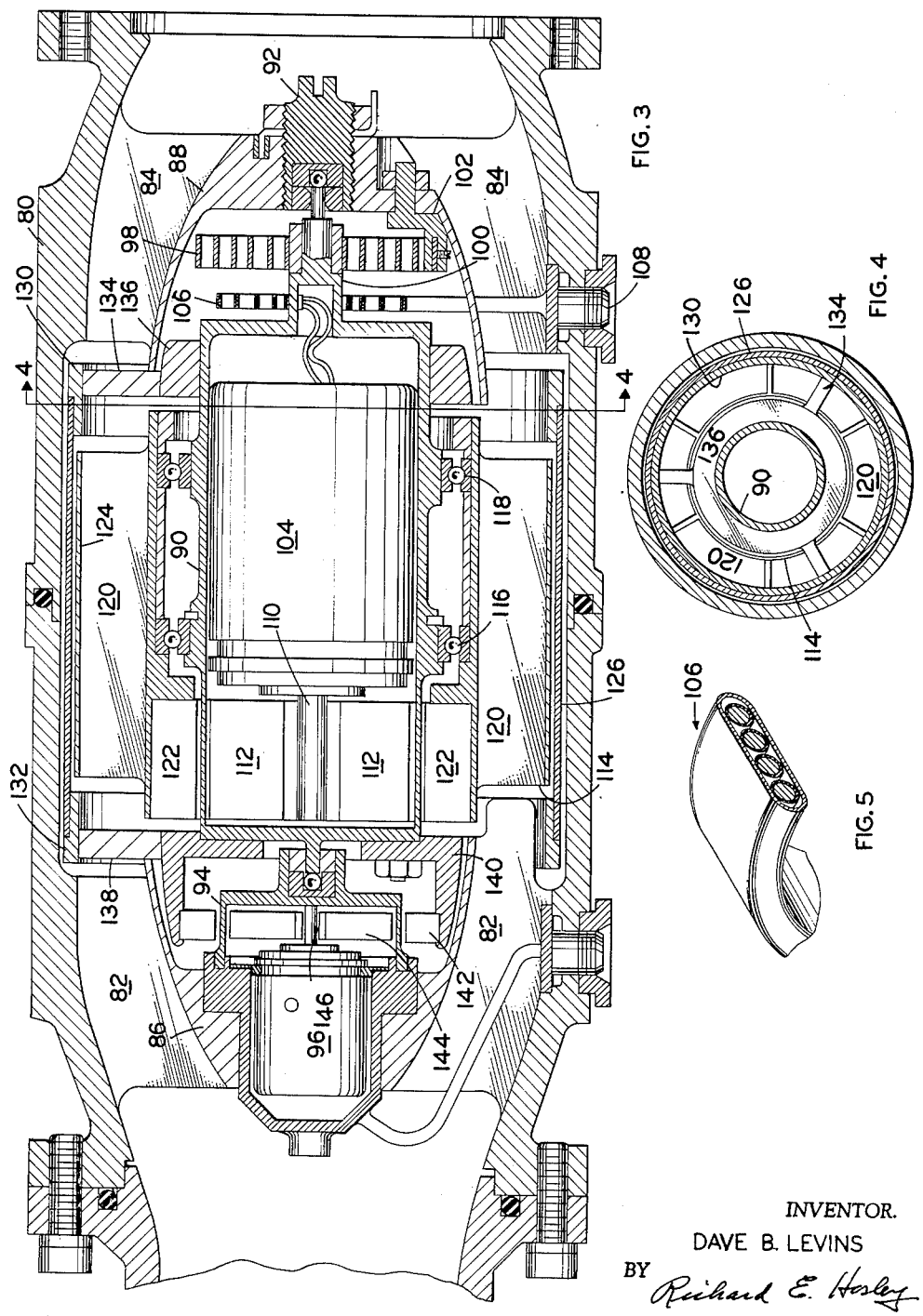
INVENTOR.
DAVE B. LEVINS
BY
*Richard E. Hosley*
HIS ATTORNEY Oct. 2, 1962  D. B. LEVINS  3,056,292
MASS FLOWMETER
Filed May 21, 1959  4 Sheets-Sheet 3

INVENTOR.
DAVE B. LEVINS
BY Richard E. Horley
HIS ATTORNEY

Oct. 2, 1962 D. B. LEVINS 3,056,292
MASS FLOWMETER
Filed May 21, 1959 4 Sheets-Sheet 4

INVENTOR.
DAVE B. LEVINS
BY
Richard E. Hosley
HIS ATTORNEY

United States Patent Office 3,056,292
Patented Oct. 2, 1962

3,056,292
MASS FLOWMETER
Dave B. Levins, Swampscott, Mass., assignor to General Electric Company, a corporation of New York
Filed May 21, 1959, Ser. No. 814,803
10 Claims. (Cl. 73—194)

This invention relates to fluid mass flowmeters and, more particularly, to novel improvements in fluid mass flowmeters of the single element angular momentum type.

If all, or substantially all, of a fluid flowing in a pipe or conduit is accelerated to a uniform velocity and in a given direction other than that of the normal flow direction by means of a member driven at a substantially constant speed, the momentum of the fluid in the given direction of such acceleration will be directly proportional to the mass of the fluid accelerated. This is true inasmuch as the momentum of the fluid is equal to a constant times the mass of the fluid accelerated times the velocity to which the fluid is accelerated; and, thus, if the final velocity of the accelerated fluid is maintained at a constant value, it can be seen that the momentum of the fluid will vary directly with the mass of the fluid being accelerated. The measurement of this momentum imparted to the fluid may be obtained through the use of a resiliently restrained reaction member such as a turbine disposed closely adjacent the fluid accelerating member to absorb the momentum imparted to the fluid by the accelerating member, which might be a rotatable impeller. Such a flowmeter having a rotatable impeller and associated turbine may be referred to as a two element angular momentum type flowmeter, and such a flowmeter is described and claimed in United States Patent No. 2,714,310, issued August 2, 1955, in the name of Frederic B. Jennings, the assignee of this patent also being the assignee of the present invention.

Another type of flowmeter for determining the mass flow of a fluid is disclosed in copending United States patent application Serial No. 768,798, filed October 22, 1958, in the name of Philip K. Bodge, this application also being assigned to the assignee of the present invention. In one embodiment of the invention of this copending application a resiliently restrained deflectable member for sensing the fluid momentum torque imparted by the impeller is an element of a drive gear train to the fluid accelerating impeller. More specifically, the deflecting member is the sun gear of a planetary drive gear train to the impeller, with the torque to the impeller being sensed by the deflection of the sun gear. The input torque to the impeller is, of course, a function of the momentum torque imparted to the fluid by the impeller, and thus, in this particular flowmeter, the necessity for a separate turbine is eliminated. The resulting structure may be referred to as a single element flowmeter. This type is readily adapted for measuring flow in either direction through the flowmeter in addition to measuring flow in one direction only as in the case of the two element flowmeter.

Another means of determining the impeller-imparted momentum to fluid within a single element flowmeter is taught in United States Patent No. 2,814,949, issued December 3, 1957, in the name of Philip K. Bodge. In this last-mentioned patent, the drive motor for a fluid accelerating impeller is provided with what may be called a dynamometer mounting so that deflections of the motor stator, which, of course, are proportional to the impeller torque, may be utilized to provide a measurement of the momentum torque imparted to the fluid.

In flowmeters of the type described above, it is usual for the fluid accelerating member to pass closely adjacent the inner walls of the housing of the flowmeter to assure that all or substantially all of the fluid passing through the flowmeter will be accelerated by the impeller. It will be apparent that the total torque applied to the impeller will include not only the torque required to impart the desired acceleration to the fluid but also certain error torques resulting from viscous shear of the fluid by the impeller as well as from friction associated with the bearings rotatably supporting the impeller. In a two element flowmeter such as described, these error torques on the impeller are, of course, not transmitted to the turbine, and, therefore, the turbine senses only the momentum torque of the fluid. Thus, a two element flowmeter of the type described in the Jennings patent may be said to be insensitive to viscous errors or any losses in the impeller drive system. However, it has been found that in the case of a single element flowmeter of the general types described above the viscous and bearing error torques may affect the accuracy of the flowmeter to an undesirable extent. More specifically, it has been found that the total torque required to be applied to the impeller to overcome the resistance offered by the viscous and friction error torques can be of such a magnitude as compared to the momentum torque, which it is desired to measure, that the total torque required to drive the impeller is no longer a sufficiently accurate measurement of the momentum torque.

Accordingly, it is the primary object of this invention to provide a single element fluid mass flowmeter of the angular momentum type having a sensing member on which is exerted torques directly proportional to the total torques applied to a fluid accelerating impeller within the flowmeter, with viscous and/or friction error torque eliminating means acting on the sensing member so that the resultant net torques thereon will be directly proportional to the momentum torque imparted to fluid by the impeller.

It is another object of this invention to provide a single element fluid mass flowmeter of the type described having novel and improved construction whereby the deflection of a deflectable stator of an electric motor drivingly connected to a fluid accelerating impeller within the flowmeter will provide an improved accuracy of representation of the mass flow of the fluid accelerated by the impeller.

It is still another object of the invention to provide a single element fluid mass flowmeter of the type described having novel and improved construction whereby the torque reaction member in a drive gear train to the impeller will present an improved accuracy of representation of the mass flow of the fluid accelerated by the impeller.

Other objects and advantages of this invention will be apparent from the following description of specific embodiments of the invention when taken in connection with the accompanying drawings illustrating these embodiments and in which:

FIG. 1 is a longitudinal cross sectional view of a single element angular momentum type fluid mass flowmeter embodying the present invention;

FIG. 2 is an enlarged sectional view of a portion of the flowmeter of FIG. 1;

FIG. 3 is a longitudinal cross sectional view of an alternative construction of a flowmeter embodying the present invention;

FIG. 4 is a reduced cross sectional view substantially along the line 4—4 of FIG. 3;

FIG. 5 is an enlarged sectional view of a portion of the flowmeter of FIG. 3;

Figure 6:
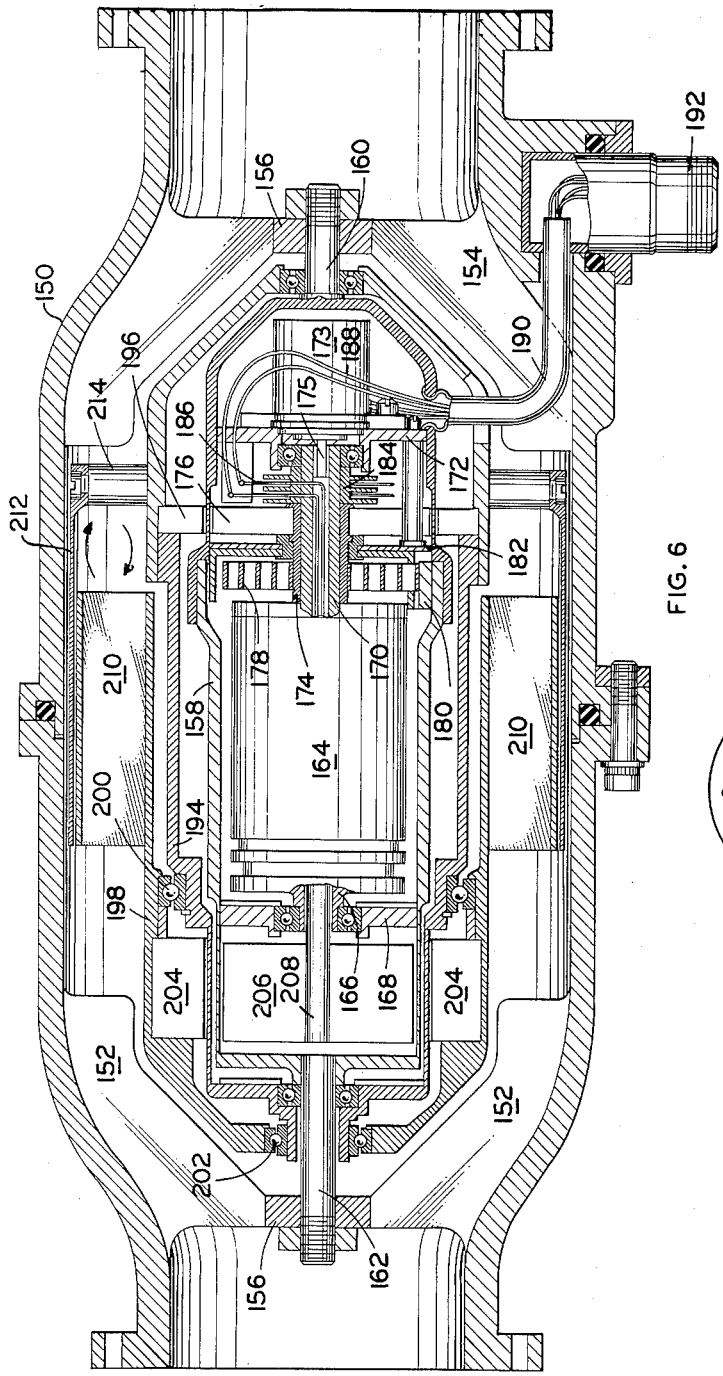
FIG. 6 is a longitudinal cross sectional view of an alternative construction of a flowmeter embodying the present invention.

Briefly, in its primary aspect, this invention may be described as contemplating a single element fluid mass flowmeter of the angular momentum type having a fluid accelerating member confined within a conduit with means for driving the accelerating member. The driving means for the accelerating member includes a deflecting member which is constructed and arranged to be deflectable in one direction by an amount directly proportional to the total power or torque applied to the accelerating member. In accordance with the invention, there is provided a viscous error eliminating member constructed and arranged relative to the accelerating member so as to be responsive to the viscous torque acting on the accelerating member and so as to reflect this error torque directly to the deflectable member in a manner tending to move the same in a direction opposite said one direction of movement thereof. Accordingly, the net resultant movement of the deflectable member in said one direction will represent the momentum torque imparted to the fluid by the accelerating member without including the viscous error torque. A description of other aspects of the invention as well as a more detailed description of the aforedescribed primary aspect is provided hereinafter.

A specific structural embodiment of a flowmeter incorporating this invention is shown in FIG. 1, wherein the flowmeter is of the axial flow single element angular momentum type and comprises a generally cylindrical diametrically split housing 10 having a fluid flow passage extending longitudinally therethrough and with means at opposite ends of the housing for coupling the same in a fluid conduit. A plurality of circularly arranged flow straightening vanes or struts 12 and 14 are arranged concentrically within the housing adjacent the opposite ends respectively thereof. The longitudinal bore of the housing is enlarged in the center portion of the housing to accommodate an annular fluid tight casing 16 enclosing the stator 18 of an electric motor. The stator casing 16 is fixedly mounted to supporting members 20 and 22 disposed at the opposite ends respectively of the casing and each comprising an outer annular portion or ring 24 secured to the casing 16 and carrying the inner race of a bearing 26, the outer race of which is mounted on the housing 10. A plurality of circularly arranged webs or struts 28 extend radially inwardly from each ring 24 and terminate in a boss 30 disposed generally coaxially of the bore through the housing 10.

Disposed coaxially within the stator casing 16 is a rotor 32 for the stator 18 with the rotor, in accordance with one aspect of the invention, also forming a fluid accelerating impeller for the flowmeter. The impeller-rotor comprises a hub or shaft portion 39 extending coaxially of the housing 10 and rotatably mounted at its opposite ends in bearings supported by the bosses 30 of the stator support members 20 and 22. The impeller further comprises a plurality of walls or partitions 36 extending radially outwardly of the hub 39 and parallel to the longitudinal axis of the hub, with the walls 36 being angularly spaced about the axis of the impeller. In the specific embodiment shown, a cylindrical permanent magnet, having a plurality of poles angularly spaced about its periphery, surrounds the radial walls 36 to define an outer cylindrical wall 38 which in cooperation with the walls 36 and hub 39 forms a plurality of circularly arranged linear flow passages arranged concentrically of the throughbore in the housing 10. These linear flow passages are spaced radially outwardly equidistant from the axis of the impeller and extend parallel to the longitudinal axis of the throughbore and the housing 10. It will be particularly observed that the inner wall 40 of the stator casing 16 and the outer surface of the outer wall 38 of the impeller are arranged next adjacent each other in closely spaced relation so that the wall 40 forms a shroud around the impeller.

The boss 30 of the stator support 22 is provided with a coaxial extension 42 projecting toward the next adjacent end of the housing 10 and into an enclosure formed by a streamlined housing 44 supported centrally of the throughbore in the housing 10 by the flow straighteners 14. A coil spring 46 is disposed within the housing 44 and arranged about the extension 42, with the inner end of the spring fixed to the extension. The outer end of the spring is fixed to the housing 44 by a spring clamp 48, whereby deflection of the stator 18 about the axis of the impeller will be resiliently restrained by the spring 46.

In accordance with the invention, and as best shown in FIGS. 1 and 2, the spring 46 comprises an elongated, imperforate flattened tubular member 50 fabricated from a resilient material, having the desired spring characteristics. Disposed within the spring 50 are a plurality of electrical leads 52, which, as shown in FIG. 1, extend out of the inner end of the spring and through the stator support 22 and are connected to the motor stator 18. The outer end of the spring 46 extends beyond the spring clamp 48 and through one of the flow straighteners 14 to an electrical connector 54 opening outwardly of the housing 10 for connection of the motor stator to a source of current. Thus, in accordance with the invention, the spring 46 not only serves to provide the sole resilient restraining force on the stator 18 but also serves to provide a fluid-tight conduit for carrying the electrical leads to the stator.

The deflections of the motor stator 18 about the axis of the impeller 34 are sensed by a pickoff 56, such as a synchro, enclosed within a housing 58 supported coaxially of the through bore in the housing 10 by a boss 60 centrally supported by the flow straighteners 12. The pickoff 56 is provided with a movable member having secured thereto a plurality of magnets 62 disposed within the casing 58. A plurality of magnets 64 are mounted for movement with the stator support 20 and cooperate with the magnets 62 to effect a corresponding movement of the movable member of the pickoff 56 to provide an electrical signal through leads within a conduit 66 leading to a connector 68 on the housing 10. The signal from the pickoff is, of course, representative of the position of the stator 18.

Figure 7:
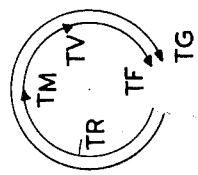
FIG. 7 is a diagrammatic representation of the torques acting upon the impeller of the flowmeter of FIG. 1.

In the use of a flowmeter as just described, the housing 10 may be connected in a fluid conduit with the fluid flowing into either end of the housing 10. Energizing of the drive motor of the flowmeter will cause a corresponding rotation of the rotor-impeller 32 to angularly accelerate substantially all of the fluid-flowing through the housing to a uniform velocity about the axis of the impeller. The torque applied to the rotor by the stator across the gap therebetween is reflected at the stator as a torque tending to rotate the stator in a direction opposite the direction of rotor movement. As a result, the stator will be deflected in such direction a limited amount as determined by the spring 46. There are, of course, certain friction forces associated with the bearings for the rotor tending to resist rotation thereof. Further, the rotation of the rotation of the rotor-impeller within a fluid filled housing also results in viscous shear forces acting upon the rotor and tending to resist rotation thereof. These friction forces and viscous shear forces are reflected in the rotor-impeller as error torques and are additive to the torque required to accelerate the fluid. Inasmuch as the rotor is preferably driven at a substantially constant speed, the torque required to accelerate the fluid will vary with the momentum imparted to the fluid, or, in other words, the mass of the fluid being accelerated. Accordingly, the total torque on the rotor is equal to this momentum torque imparted to the fluid plus the friction and viscous error torques. The rotor torque is, of course, of the same level as the torques transmitted across the gap between the stator and the rotor. With reference to FIG. 7, there is diagrammatically illustrated the relationship of these various torques with respect to a clockwise rotating impeller. Thus, as discussed above and as shown in FIG. 7:

(1) $\quad T_R = T_M + T_V + T_F = T_G$ where $T_R$ equals the total torque applied to the rotor; $T_M$ equals the angular momentum imparted to the fluid by the impeller in terms of torque; $T_V$ equals viscous error torque on the rotor; $T_F$ equals friction error torque on the rotor; and $T_G$ equals the total torque across the gap between the rotor and the stator.

Figure 8:
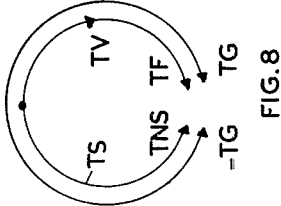
FIG. 8 is a diagrammatic representation of the torque acting upon the stator of the drive motor of the flowmeter of FIG. 1.

It will be apparent from FIG. 1 that the friction forces tending to resist rotation of the rotor also tend to rotate the support for the bearings so as to carry this support with the impeller in the same direction of rotation. Thus, the stator supports 20 and 22 will tend to be rotated with the impeller and being fixed to the stator casing 16 will tend to carry the stator 18 with the impeller. Correspondingly, the viscous forces acting on the impeller will tend to couple the outer surface of the impeller to the inner wall 40 of the stator casing 16 to tend to carry the casing with the impeller. It can thus be seen that the friction and viscous error torques acting on the rotor are transferred back to the deflectable stator casing in the same sense or direction as applied to the rotor. The total torque applied across the gap between the rotor and the stator is, of course, reflected in the stator as an equal and opposite torque, $-T_S$, or, in other words, as can be seen from FIG. 8 which diagrammatically represents the torques acting on the stator casing 16.

(2) $\quad T_G = -T_S = T_V + T_F - T_{NS}$ where $T_{NS}$ is the net torque acting on the stator casing and from (2):

(3) $\quad T_{NS} = T_V + T_F - T_G$ substituting (1) in (3):

(4) $\quad T_{NS} = T_V + T_F - T_M - T_V - T_F = -T_M$ or neglecting the direction of the movement of rotation of the stator casing relative to the rotor:

(5) $\quad T_{NS} = T_M$

Thus, it can be seen that the net torque acting on the stator casing 16 is effectively only that represented by the momentum torque imparted to the fluid by the rotor-impeller. The only remaining error in the signal from the flowmeter is that caused by the bearings supporting the deflectable casing 16. However, in practice, this error may be maintained at a very low level by the proper selection of the bearings and also, of course, this error may be easily compensated for. This error, is, of course, also present in the two element flowmeter and in any flowmeter in which a deflectable member is used to sense the mass flow.

Turning now to FIGS. 3 and 4, the flowmeter shown therein is of the single element angular momentum type and comprises a diametrically split housing 80 having a through bore for the passage of fluid. At the opposite ends of the housing respectively are a plurality of flow straightening struts 82, 84 centrally supporting a pair of streamlined brackets 86, 88, respectively. A generally cylindrical deflectable fluid-tight motor casing 90 is coaxially received within the housing 80 and mounted in bearings at its opposite ends respectively, with the bearings at one end of the casing being carried by a threaded support 92 extending coaxially of the bracket 88 and with the bearing at the other end being carried by a pickoff housing 94 fixed to the bracket 86 and housing a pickoff 96. A coiled restraining spring 98 is arranged about the shaft extension 100 of the motor casing, with the inner end of the spring being connected to the shaft extension 100 and the outer end of the spring being connected to a spring clamp 102 carried by the bracket 88. Disposed within the casing 90 and fixed to the casing is an electric motor 104. The electrical leads to the motor 104 extend from within the casing 90 into the inner end of a tubular coiled member 106 arranged about the shaft extension 100 with its inner end connected to the extension 100. As most clearly shown in FIG. 5, the tubular coiled member 106 is of a construction generally similar to the spring 46, previously described, whereby the motor leads are led through the member 106 which is connected at its outer end to a connector 108 to which may be connected a suitable source of electrical power for the motor. In the specific embodiment of FIG. 3, the tubular member 106 is fabricated from metal having spring characteristics whereby the member 106, as well as the spring 98, resiliently resists movement of the motor casing 90 about the axis of the housing 80. However, of course, if desired, the spring force of the member 106 could be selected to be sufficiently low that it would not provide any substantial biasing force on the casing 90 but rather the member 106 would be utilized substantially solely as a lead wire conduit for the motor.

The motor 104, which if desired may be a gear motor including a speed change gear train, comprises a stator (not specifically shown) which is fixed for movement with the outer housing for the motor and thus to the casing 90. The motor also includes a rotor (not shown) and a drive shaft 110 extending externally of the motor and to which is mounted a plurality of magnets 112. Disposed coaxially over the casing 90 is a generally cylindrical impeller 114 rotatably mounted on the casing 90 by bearings 116, 118. The impeller 114 is of a construction generally similar to the impeller 32 of the flowmeter of FIG. 1 and thusly includes a plurality of circularly arranged linear flow passages 120 disposed concentrically of the axis of the casing 90 and extending parallel to the casing axis. Mounted on the impeller 114 are a plurality of magnets 122 cooperating with the magnets 112 of the motor 104 to provide for rotation of the impeller in response to energizing of the motor Disposed concentrically about the outer wall 124 of the impeller in closely radially spaced relation is a cylindrical shroud 126, the outer surface of which is disposed closely adjacent the inner wall of the housing 80. The shroud is supported at its opposite ends on a pair of annular members or rings 130, 132. The ring 130 is supported by a plurality of angularly spaced, radially extending struts 134 supported at their inner ends on an annular collar 136 disposed telescopically over and fixed to the deflectable casing 90. The ring 132 is similarly supported by a plurality of radially extending angularly spaced struts 138 supported at their inner ends on a shroud support member 140 fixed to the deflectable casing 90. The shroud supporting member 140 also carries a plurality of magnets 142 cooperating with a plurality of magnets 144 disposed within the pickoff housing 94 and connected to a movable shaft 146 forming a part of the pickoff. Movement of the shaft 146 of the pickoff 96 relative to the pickoff housing will result in an output signal from the pickoff representative of the angular movement of the casing 90.

In the use of the flowmeter of FIG. 3, fluid may be introduced into the flowmeter from either end thereof, and the fluid will be accelerated by the impeller 114 in a manner similar to that described in connection with the flowmeter of FIG. 1. Correspondingly, the torque applied to the impeller 114 by the motor 104 will result in a deflection of the motor casing 90 in a direction opposite to impeller rotation. The bearing error torques resulting from the bearing 116, 118 will, as is apparent from FIG. 3, increase the total power required to drive the impeller and will also be reflected on the casing 90 by a torque tending to rotate the casing in the direction of impeller rotation. The viscous shear forces on the impeller will tend to further increase the power required to rotate the impeller. However, the coupling between the impeller 114 and closely spaced shroud 126 will tend to carry the shroud with the impeller so that the viscous error torque will be transferred through the shroud and its supporting structure directly back to the casing 90 in the same sense or direction as impeller rotation. Accordingly, as in the case of the flowmeter of FIG. 1, the friction and viscous error torques of the impeller are not represented by the deflection of the casing 90 about its axis but rather the torque represented by the deflection of the casing 90 will be effectively only the momentum torque imparted to the fluid by the impeller. Accordingly, the signals from the pickoff 96, which senses the deflection of the casing 90, will not include errors resulting from viscous and friction error torques.

Turning now to FIG. 6, there is shown a further alternative embodiment of a single element angular momentum type flowmeter which comprises a diametrically split housing 150 having a longitudinal throughbore for the passage of fluid through the housing. Disposed adjacent the opposite ends of the housing are angular spaced, radially inwardly extending flow straightening struts or vanes 152, 154, with each set of vanes terminating centrally of the housing in a boss 156. An elongated hollow motor casing 158 is disposed coaxially within the housing 150, with shaft extension 160, 162 extending from the opposite ends of the casing 158 and fixedly mounted on the bosses 156. Disposed within the casing 158 is an electric motor 164 which might be a gear motor and which has an outer housing 166 supported at its leftward end by a bearing, the outer race of which is fixed to the fixed casing 158 by means of an annular support 168. A shaft extension 170 extends from the opposite end of the motor housing 166 and is supported at its terminal end in a bearing, the outer race of which is fixedly supported on the fixed casing 158 by a supporting member 172. The support 172 also carries a pickoff 173 having a movable member 175 connected for movement with the shaft extension 170 to sense movement of the motor housing 166 and provide a signal representative of the angular position of the motor stator. Telescopically received over the leftward end of the shaft extension 170 is a bushing 174 mounting for rotation with the shaft extension 170 a plurality of magnets 176. A coiled restraining spring 178 is arranged about the bushing 174 between the magnet 176 and the motor 164, with the inner end of the spring attached to the bushing and with the outer end of the spring fixed to a spring clamp 180 carried by the fixed casing 158. Supported intermediate the magnets 176 and spring 178 is a magnetically insulating shield 182 to shield the spring from the magnets 176. A bushing 184 of electrically insulating material is telescopically engaged over the rightward end of the shaft extension 170 and is provided with a plurality of radially extending circumferential ribs which are axially spaced to accommodate a plurality of spiral leads such as at 186 for connecting the motor 164 to leads 188 extending from the spirals 186 through a conduit 190 to an electrical connector 192 on the casing 150. The conduit 190 also carries the leads from the pickoff 173 to the connector 192. As will be apparent from the above description and the accompanying FIG. 6, the casing 158 is maintained fluid tight so as to preclude entrance of any of the fluid into the casing and contact with the motor and other equipment therein.

Disposed concentrically about the fixed casing 158 is a deflectable casing or member 194 supported at its opposite ends on bearings, the inner races of which are mounted on the shaft extensions 160, 162 of the fixed casing 158. The deflectable casing 194 carries adjacent its rightward end a plurality of magnets 196 cooperating with the magnets 176 on the shaft extension 170 of the motor housing 166 to tend to deflect the motor housing 166 in response to deflection of the deflectable casing 194. Telescopically received over and coaxially of the deflectable casing 194 is an impeller 198 rotatably supported by bearings 200, 202, the inner races of which are carried by the deflectable housing 194. The impeller carries a plurality of magnets 204 cooperating with a plurality of magnets 206 carried by a drive shaft 208 of the motor 164, so that energizing of the motor with corresponding rotation of the magnets 206 disposed within the casing 158 will effect rotation of the impeller. The impeller is constructed in a manner similar to the structure previously described so as to provide a plurality of circularly arranged linear elongated flow passages 210 disposed concentrically within the housing 150 and extending parallel to the axis of the impeller. A cylindrical shroud 212 is disposed coaxially about the impeller in closely spaced relation to the outer wall of the impeller and the inner wall of the housing 150. The shroud 212 is supported at one end in cantilever fashion by a plurality of struts 214 extending radially inwardly of the shroud and fixedly supported at their inner ends on the deflectable casing 194.

The over-all operation of the flowmeter of FIG. 6 is generally similar to that of the flowmeter described, whereby the impeller will angularly accelerate fluid introduced through either end of the flowmeter to impart an angular momentum to the fluid about the axis of the impeller. The friction error torques of the impeller caused by the bearings 200, 202 will be reflected directly back to the deflectable casing 194 in the same direction as impeller rotation. Correspondingly, viscous error torques on the impeller will be reflected by the shroud 212 directly back to the deflectable casing 194 in the same direction as impeller rotation. Accordingly, the deflectable casing 194 will tend to be rotated by these error torques in the same direction as impeller rotation. The magnetic coupling of the deflectable casing to the shaft extension 170 of the motor housing 166 will transmit the error torque from the deflectable casing 194 to the motor housing 166 to tend to rotate the same in the direction of impeller rotation, with the torque being proportional to the error torques. The reaction torque on the motor housing 166 due to rotation of the impeller 210 will tend to rotate the motor housing in a direction opposite that of the deflectable casing 194 and, of course, in an amount proportional to the total torque applied to the impeller. Accordingly, the resultant deflection of the motor housing will not include the error torques caused by friction and viscous shear forces on the impeller.

As will be apparent from FIG. 6, the torque on the deflectable casing 194 as a result of the viscous coupling by the impeller and shroud 212 may be of a value somewhat higher than the actual viscous error torque on the impeller due to the difference in radii between the shroud and impeller. Further, as is known, during rotation of an impeller of the type shown in FIGURE 6 and also FIGURES 1, 3, and 9, the difference in pressure between the fluid adjacent the inner wall of the impeller and fluid adjacent the outer wall of the impeller induces a circulation of fluid in the direction of the arrows in FIG. 6. This induced movement of the fluid is often referred to as a smoke ring effect, and this smoke ring effect tends to provide a coupling between the impeller and next adjacent flow straighteners, which may introduce an error into the output signal of the flowmeter. Accordingly, it should be noted that the total length of the shroud may be adjusted to compensate for the smoke ring effect and difference in radii between the shroud and impeller so as to eliminate these errors from the output signal. As will be apparent, by adjustment of shroud length, if desired, over- or under- compensation may be provided.

Figure 9:
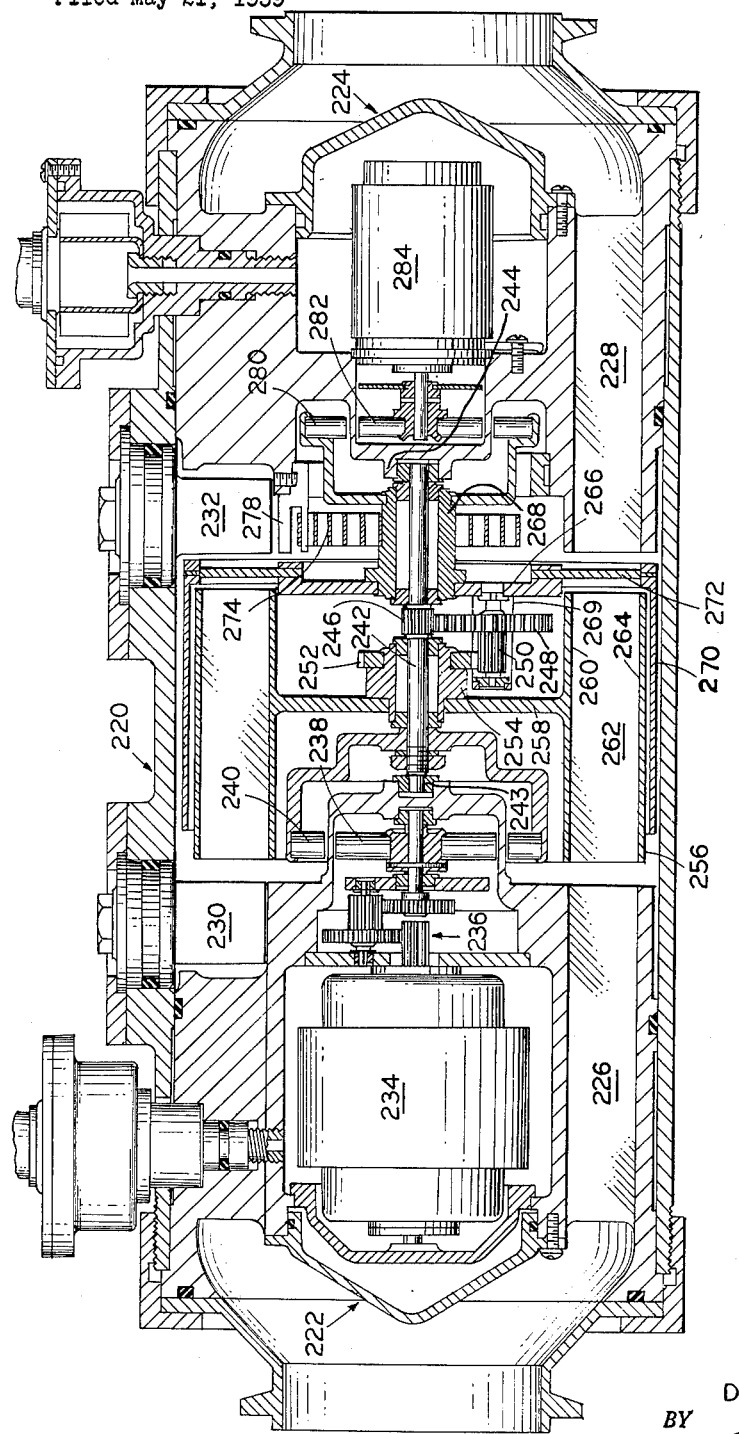
FIG. 9 is a longitudinal cross sectional view of a flowmeter of a type wherein the impeller is driven through a reduction gear train and incorporating the present invention.

With reference to FIG. 9, there is shown a single element two-way angular momentum type flowmeter of alternative construction utilizing a reduction gear drive for drivingly connecting the impeller and drive motor. The flowmeter shown in FIG. 9 generally comprises a cylindrical elongated shell-like housing 220 with a pair of streamlined brackets 222 and 224 telescopically received within the opposite ends respectively of the housing and supported in sealed relation on the inner wall of the housing. The brackets are provided with a plurality of circularly arranged linear flow straightening passages 226 and 228, respectively, with the flow passages being disposed coaxially within the housing 220 in radially outwardly spaced relation from the axis of the housing and with the passages extending parallel to the housing axis. A pair of compensating vanes 230 and 232 are rotatably supported on the housing 220, with the vanes extending generally in alignment with one of the radial walls of each of the brackets 222 and 224 forming the flow passages in the brackets. These vanes are individually adjustable to compensate for manufacturing inaccuracies in the brackets 222, 224 which would adversely affect the flow straightening function of the passages 226, 228.

Sealed within the bracket 222 is an electric drive motor 234 having an outer casing fixed to the bracket 222. Also enclosed within the bracket 222 is a reduction gear train 236 drivingly connecting the motor 234 to a plurality of rotatable drive magnets 238 also disposed within the bracket 222. The magnets 238 cooperate with a plurality of magnets 240 rotatably mounted for movement with a shaft 242 extending coaxially of the housing 220 and rotatably supported at its opposite end by bearings 243, 244 on the inner oppositely facing ends of the brackets 222, 224. As will be apparent, energizing of the motor 234 will result in rotation of the shaft 242.

A driving pinion 246 is mounted intermediate the ends of the shaft 242 for rotation therewith and is drivingly engaged with a gear 248 having mounted coaxially thereof for rotation therewith a pinion 250. The pinion 250 is drivingly engaged with a gear 252 arranged coaxially of the shaft 242 and mounted for rotation with a hub 254 of an impeller 256. The hub 254 is generally cylindrical and is telescopically disposed coaxially over the shaft 242 and rotatably supported thereon by a plurality of bearings. The impeller further includes a web 258 extending at right angles from the hub 254 and carrying along its outer periphery a cylindrical portion comprising an inner cylindrical wall 260 and a plurality of radially extending walls 262 supporting an outer cylindrical wall 264. The walls 260, 262, and 264 define a plurality of circularly arranged linear flow passages disposed coaxially of the housing 220 and aligned with the flow straightening passages 226 and 228.

The gears 248 and 250 are fixedly mounted on a shaft extending coaxially thereof, with one end of the shaft being rotatably supported on a reaction member 266 carried by a bushing 268 arranged coaxially over the shaft 242 and supported thereon by a plurality of bearings so that the support member 266 is movable about the axis of the shaft 242. The other end of the shaft for the gears 248 and 250 is supported on a bracket 269 carried by the reaction member 266. Arranged telescopically over the impeller 256 in coaxial, closely radially spaced relation is a cylindrical shroud 270. The shroud is supported on the reaction member 266 by means of a plurality of struts 272 extending radially inwardly from the shroud and spaced angularly about the axis of the shaft 242. A coiled spring 274 is arranged about the bushing or sleeve 268 with the inner end of the spring fixed to the bushing and with the outer end of the spring clampingly engaged by a spring clamp 278 fixedly mounted on the bracket 224. A plurality of magnets 280 are mounted for movement with the bushing 268 and cooperate with a plurality of magnets 282 disposed within the brackets 224. The magnets 282 are mounted for movement with a shaft or movable member of a pickoff 284 sealed within the bracket 224. The pickoff 284 will provide an electrical signal representing angular displacement of the magnets 282; and, as will be apparent from the foregoing, displacement of the magnets 282 will occur in response to angular displacement of the reaction member 266. Further, as will be apparent from the foregoing, the reaction member 266 forms an element of the drive gear train for the impeller 256 and will tend to be displaced about the axis of the shaft 242 in response to the application of torque to the impeller. Accordingly, displacement of the reaction member 266 will be a measure of the torque required to drive the impeller 256.

In the embodiment of FIG. 9, a clockwise rotation of the drive shaft 242 will result in a corresponding clockwise rotation of the impeller 256. Correspondingly, as is believed will be apparent from FIG. 9, there will tend to be a counterclockwise displacement of the reaction member 266. The viscous coupling between the impeller 256 and shroud 270 will, of course, tend to rotate the shroud in a clockwise direction and thus offset any viscous error torques on the impeller as reflected at the reaction member 266. It will be noted that the gears 248 and 250 which are mounted for rotary displacement with reaction member 266 about the axis of shaft 242 against the bias of spring 274 experience a reaction force variable in accordance with the total torque delivered by motor 234 to impeller 256. The gears 248 and 250 may therefore be considered a first sensing means having an output in the form of a reaction force or torque variable in accordance with the total torque applied to the impeller by the drive motor. The shroud 270 which experiences force or torque because of the viscous coupling between the shroud and impeller 256 may be considered a second sensing means having an output in the form of a force or torque responsive to the component of the total torque delivered to the impeller by the drive motor due to viscous coupling of the impeller with the surrounding fluid. Because the shroud 270 is mechanically connected to the reaction member 266, the reaction member experiences torques from both the first and second sensing means; and since these torques are in opposite directions, the reaction member has a net output in the form of a displacement against the bias of spring 278. The reaction member 266 and the mechanically coupled pickoff 284 may therefore be considered to be indicating means coupling the outputs of the first and second sensing means in opposing relation to produce a net output indicative of the mass rate of flow through the flowmeter. The friction forces in the bearings mounting the impeller represent, of course, an error torque at the reaction member 266. However, it is to be noted that the reaction member is mounted on bearings on the drive shaft 242 as is the impeller. Accordingly, friction forces in the bearings mounting the reaction member will result in a tendency of the reaction member 266 to follow the shaft in a clockwise direction. This last-mentioned force on the reaction member is, of course, in a sense opposite the momentum torque reaction on the impeller 266 and will be of a magnitude substantially the same as the friction error torques due to the impeller bearings. Accordingly, there will be an insignificant, if any, representation of friction error in the net deflection of the reaction member 266. As discussed in connection with the previously described embodiment, the length of the shroud may be varied to compensate for the differences in radii between the shroud and periphery of the impeller which would result in different values of viscous error torque being applied to the deflectable member 266 by the impeller and shroud. Further, a difference in gear ratios between the shaft 242 and impeller and between the shaft 242 and shroud may correspondingly cause different values of viscous error torque to be applied to the deflectable member. Therefore, the length of the shroud is selected to provide a viscous error torque on the deflectable member which corresponds to that applied to the impeller taking into account the different radii and gear ratios associated with the shroud and impeller.

While this invention has been described in terms of the various embodiments specifically shown in the accompanying drawings, it is to be understood that the foregoing description as well as the accompanying drawings are to be taken only in an illustrative sense and are not to be considered as limiting the invention to any of the specific embodiments described and shown. It is further intended that the invention shall be limited only by the appended claims, which claims shall include within their scope all structure logically falling within the language of the claims.

What I claim as new and desire to secure by Letters Patent of the United States is:

1. In a fluid mass flowmeter of the single element type, a housing for conducting a flowing fluid therethrough, an impeller movably mounted within the housing for accelerating fluid flowing through the housing in a direction other than its normal flow path through the housing, drive means for the impeller including a reaction member which is subject to a reaction force in one direction which is opposite to the direction of the force imparted to the impeller by the drive means, a viscous error eliminating member disposed closely adjacent the impeller to provide a viscous coupling therebetween when fluid is disposed between the impeller and viscous error eliminating member, said viscous error eliminating member being constructed and arranged to impart a second force on the reaction member in a direction opposite said one direction and means for sensing the net force exerted on said reaction member by said drive means and said viscous error eliminating member.

2. In a fluid mass flowmeter of the single element angular momentum type, a housing, a fluid accelerating impeller rotatably within the housing for movement about its axis, drive means for the impeller including a reaction member arranged to deflect upon application of torque to the impeller by the drive means, said reaction member being resiliently restrained against movement in one direction in response to driving of the impeller by the drive means, a shroud member disposed closely adjacent the impeller to provide a viscous coupling between the shroud member and impeller when a fluid is disposed therebetween, means connecting the shroud member to said reaction member to impart torque to the reaction member in a direction opposite said one direction of movement thereof, and means to sense the deflection of said reaction member.

3. In a fluid mass flowmeter of the single element angular momentum type, a housing for conducting a flowing fluid, a rotatable fluid accelerating impeller within the housing, drive means for the impeller including a reaction member arranged to deflect upon application of torque to the impeller by the drive means, said deflectable member being mounted for resiliently restrained movement in one direction in response to driving of the impeller, bearing means mounting the impeller for rotation relative to said reaction member, a shroud member disposed closely adjacent the impeller to provide a viscous coupling between the shroud member and impeller when a fluid is disposed therebetween, means connecting the shroud member to said reaction member to impart torque to the reaction member in a direction opposite to said one direction of movement thereof, and means to sense the deflection of said reaction member.

4. A fluid mass flowmeter of the single element angular momentum type comprising a housing for conducting a flowing fluid, a generally cylindrical fluid accelerating impeller rotatably mounted within the housing for movement about its longitudinal axis and having a plurality of fluid flow passages extending longitudinally therethrough for the passage of substantially all of a fluid flowing through the housing, drive means for the impeller including a reaction member on which is exerted a reaction torque upon application of driving torque to the impeller by said drive means, said reaction torque tending to move said reaction member in one direction, a generally cylindrical viscous error compensating shroud arranged coaxially over the impeller in closely spaced relation to provide a viscous coupling between the impeller and shroud when fluid is disposed therebetween, and means connecting the shroud and the reaction member to apply to said reaction member an opposing torque which is a function of the torque on the shroud resulting from the viscous coupling of the shroud and impeller; and means for sensing the net torque exerted on said reaction member.

5. A fluid mass flowmeter of the single element angular momentum type comprising a housing for conducting a flowing fluid, a generally cylindrical fluid accelerating impeller within the housing having a plurality of circularly arranged fluid flow passages disposed coaxially of the impeller and extending longitudinally therethrough for the passage of substantially all of a fluid flowing through the housing, drive means for the impeller including a reaction member subject to the torque imparted to the impeller by said drive means, said reaction member being mounted for resiliently restrained movement in one direction about the axis of the impeller in response to driving of the impeller, a generally cylindrical shroud disposed coaxially over the impeller in radially outwardly closely spaced relation to provide a viscous coupling between the shroud and impeller, means connecting the shroud to the reaction member for movement therewith to exert on said reaction member in a direction about its axis opposite said one direction the torque exerted on the shroud by reason of its viscous coupling to the impeller, and means to sense the deflection of said reaction member.

6. In a fluid mass flowmeter of the single element angular momentum type, a housing for conducting a flowing fluid, a rotatable fluid accelerating impeller disposed within the housing, means for driving the impeller including a gear train and a reaction member supporting a gear in said train and on which is exerted a torque substantially proportional to the torque imparted to the impeller by the drive means, a generally cylindrical shroud arranged coaxially over said impeller in closely radially spaced relation to provide a viscous coupling between the shroud and impeller, the shroud being connected to said reaction member to provide that viscous coupling torques applied to the shroud will be transmitted to said reaction member in a direction opposite to the torques exerted on said reaction member by said gear train, and means for sensing the net torque exerted on said reaction member.

7. In a fluid mass flowmeter of the single element angular momentum type, a housing for conducting a flowing fluid, a rotatable fluid accelerating impeller disposed within the housing, means for driving the impeller in one direction including a rotatable drive shaft extending coaxially of the impeller, bearing means carried by the shaft rotatably supporting the impeller, a gear train drivingly connecting the shaft to the impeller including a gear, a reaction member supporting said gear, said gear and reaction member being constructed and arranged so that the torque imparted to said impeller by the drive means will be exerted substantially proportionally on said reaction member, bearing means rotatably supporting the reaction member on said drive shaft for movement about the axis of the shaft, means resiliently restraining movement of the reaction member about said shaft, a generally cylindrical shroud arranged coaxially over said impeller in closely radially spaced relation to provide a viscous coupling between the shroud and impeller, the shroud being connected to said reaction member to provide that viscous coupling torques applied to the shroud will be transmitted to said reaction member in a direction opposite to the torques exerted on said reaction member by said gear, and means for sensing the net torque exerted on said reaction member.

8. In a fluid mass flowmeter of the single element angular momentum type, a housing for conducting a flowing fluid, a rotatable fluid accelerating impeller disposed within the housing, means for driving the impeller including an electric drive motor within the housing and a reduction gear train connecting the motor and impeller and including a drive gear, a deflectable member rotatably mounted for resiliently restrained angular movement in one direction, means rotatably supporting said drive gear on said deflectable member at a point spaced radially from the axis of said deflectable member so that said drive gear exerts a torque on said deflecting member in said one direction, a generally cylindrical shroud arranged coaxially over said impeller in closely radially spaced relation to provide a viscous coupling between the shroud and impeller, means connecting the shroud to said deflectable member to apply torques on the shroud to said deflectable member in a direction opposite said one direction, and means for sensing the movement of said deflectable member in said one direction.

9. In a fluid mass flowmeter of the single element angular momentum type, a housing for conducting a flowing fluid, a rotatable fluid accelerating impeller disposed within the housing, means for driving the impeller including an electric motor within the housing, a shaft extending coaxially of the impeller and supported within said housing for rotation, means drivingly connecting the motor and shaft, a gear fixed for rotation with the shaft, means connecting said gear and impeller including a second gear, a deflectable reaction member rotatably supported on said shaft for resiliently restrained movement about the shaft axis, means rotatably mounting said second gear on said deflectable member with the axis of said second gear extending in radially spaced parallel relation to the axis of said deflectable member so that said second gear exerts a torque on said deflectable member in one direction, a generally cylindrical shroud arranged coaxially over said impeller in closely radially spaced relation to provide a viscous coupling between the shroud and impeller, the shroud being connected to said deflectable member to transmit torques on said shroud to the deflectable member in a direction opposite to said one direction and means connected to said deflectable member for sensing the deflections thereof about said shaft axis.

10. In a fluid mass flowmeter a fluid-conducting housing, a rotatable impeller mounted within said housing arranged to impart angular momentum to the fluid flowing through the housing, drive means for the impeller, a first sensing means having an output responsive to the total torque applied to said impeller by said drive means, a second sensing means having an output responsive to the component of said total torque due to viscous coupling of the impeller with the surrounding fluid, said second sensing means comprising a movable shroud member disposed coaxially over the impeller in closely spaced relation therewith, and indicating means coupling the outputs of said first and second sensing means in opposing relation to produce a net output indicative of the mass rate of flow through said flowmeter.

References Cited in the file of this patent

UNITED STATES PATENTS

| | | |
|---|---|---|
| 2,375,003 | Kent | May 1, 1945 |
| 2,472,609 | Moore | June 7, 1949 |
| 2,529,481 | Brewer | Nov. 14, 1950 |
| 2,629,859 | Taylor | Feb. 24, 1953 |
| 2,758,830 | Bentley | Aug. 14, 1956 |
| 2,814,949 | Bodge | Dec. 3, 1957 |
| 2,832,218 | White | Apr. 29, 1958 |
| 2,943,483 | Benson | July 5, 1960 |

FOREIGN PATENTS

| | | |
|---|---|---|
| 711,109 | Great Britain | June 23, 1954 |
| 807,546 | Great Britain | Jan. 14, 1959 |